(12) United States Patent
Kwon et al.

(10) Patent No.: US 11,682,525 B2
(45) Date of Patent: *Jun. 20, 2023

(54) MULTILAYER CERAMIC CAPACITOR

(71) Applicant: SAMSUNG ELECTRO-MECHANICS CO., LTD., Suwon-si (KR)

(72) Inventors: Hyung Soon Kwon, Suwon-si (KR); Kyoung Jin Cha, Suwon-si (KR); Ji Hong Jo, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/208,559

(22) Filed: Mar. 22, 2021

(65) Prior Publication Data

US 2021/0210286 A1 Jul. 8, 2021

Related U.S. Application Data

(63) Continuation of application No. 16/823,840, filed on Mar. 19, 2020, now abandoned, which is a
(Continued)

(30) Foreign Application Priority Data

Jul. 26, 2018 (KR) .................. 10-2018-0087283

(51) Int. Cl.
*H01G 4/224* (2006.01)
*H01G 4/30* (2006.01)
(Continued)

(52) U.S. Cl.
CPC .......... *H01G 4/224* (2013.01); *H01G 4/1227* (2013.01); *H01G 4/30* (2013.01); *H01G 4/232* (2013.01)

(58) Field of Classification Search
CPC ................. H01G 4/224; H01G 4/30
See application file for complete search history.

(56) References Cited

U.S. PATENT DOCUMENTS 7,859,823 B2 12/2010 Suzuki
9,368,281 B2 * 6/2016 Morita ............... H01G 4/30
(Continued)

FOREIGN PATENT DOCUMENTS

| CN | 101320624 A | 12/2008 |
| CN | 103102153 A | 5/2013 |

(Continued)

OTHER PUBLICATIONS

Office Action issued in corresponding Korean Patent Application No. 10-2018-0087283 dated Nov. 14, 2019, with English translation.
(Continued)

*Primary Examiner* — Eric W Thomas
(74) *Attorney, Agent, or Firm* — Morgan, Lewis & Bockius LLP

(57) ABSTRACT

A multilayer ceramic capacitor includes: a ceramic body including a dielectric layer, a first internal electrode and a second internal electrode arranged to face each other with the dielectric layer interposed therebetween; and a first external electrode disposed on an exterior surface of the ceramic body and a second external electrode disposed on the exterior surface of the ceramic body, wherein the ceramic body includes an active portion, forming capacity, cover portions disposed on upper and lower portions of the active portion, and margin portions disposed on a side surface of the active portion, and wherein the dielectric layer, the cover portions, and the margin portions of the active portion include magnesium (Mg) having content of more than 0 mole, and less than or equal to 1.0 mole, relative
(Continued)

to titanium (Ti) included in the dielectric layer, the cover portions and the margin portions of the active portion.

36 Claims, 3 Drawing Sheets

Related U.S. Application Data continuation of application No. 16/156,694, filed on Oct. 10, 2018, now Pat. No. 10,636,569.

(51) Int. Cl.
*H01G 4/12* (2006.01)
*H01G 4/232* (2006.01)

(56) References Cited

U.S. PATENT DOCUMENTS

| | | |
|---|---|---|
| 9,552,925 B2 | 1/2017 | Masunari et al. |
| 9,859,058 B2 | 1/2018 | Hong et al. |
| 10,325,721 B2 | 6/2019 | Murasawa et al. |
| 10,614,959 B2 | 4/2020 | Kwon et al. |
| 2008/0304204 A1 | 12/2008 | Suzuki |
| 2013/0119827 A1 | 5/2013 | Kang et al. |
| 2013/0208399 A1 | 8/2013 | Morita et al. |
| 2014/0036407 A1 | 2/2014 | Tanigushi et al. |
| 2014/0083755 A1 | 3/2014 | Lee et al. |
| 2015/0287535 A1 | 10/2015 | Nakanishi et al. |
| 2015/0340156 A1 | 11/2015 | Masunar et al. |
| 2015/0364259 A1 | 12/2015 | Kanzaki et al. |
| 2016/0196918 A1 | 7/2016 | Hong et al. |
| 2016/0284473 A1 | 9/2016 | Murasawa et al. |
| 2017/0040111 A1 | 2/2017 | Kim |
| 2017/0169952 A1 | 6/2017 | Kato et al. |
| 2018/0261390 A1 | 9/2018 | Sakate et al. |

FOREIGN PATENT DOCUMENTS

| | | |
|---|---|---|
| CN | 103570346 A | 2/2014 |
| CN | 103700499 A | 4/2014 |
| CN | 105097283 A | 11/2015 |
| CN | 105761934 A | 7/2016 |
| CN | 106024382 A | 10/2016 |
| CN | 106887333 A | 6/2017 |
| JP | 2010-103566 A | 5/2010 |
| JP | 2016-015369 A | 1/2016 |
| KR | 10-2014-0032293 A | 3/2014 |
| KR | 10-2015-0135092 A | 12/2015 |
| KR | 10-2016-0084614 A | 7/2016 |
| WO | 2012/023334 A1 | 2/2012 |

OTHER PUBLICATIONS

Notice of Allowance issued in corresponding U.S. Appl. No. 16/156,694 dated Dec. 20, 2019.
Office Action issued in corresponding U.S. Appl. No. 16/156,694 dated May 16, 2019.
Office Action issued in corresponding U.S. Appl. No. 16/823,840 dated Dec. 21, 2020.
Office Action issued in corresponding U.S. Appl. No. 16/823,840 dated Jul. 30, 2020.
Office Action issued in corresponding U.S. Appl. No. 16/823,840 dated Apr. 14, 2020.
Chinese Office Action dated Aug. 20, 2021 issued in Chinese Patent Application No. 201811442965.0 (with English translation).
H. Gong, et al., "Effect of Mg on the dielectric and electrical properties of BaTiO3-based ceramics," vol. 50(21) of Journal of Materials Science, pp. 6898-6906, Nov. 2015 (English Abstract Included).
B. Li, et al., "Effect of Mg ion on the dielectric properties of nano-doped BaTiO3 ceramics," Proceedings of the 15th Annual Conference on Electronic Components of the Chinese Institute of Electronics, pp. 46-52, Nov. 2008 (English Abstract Included).

* cited by examiner

I-I'

MULTILAYER CERAMIC CAPACITOR

CROSS-REFERENCE TO RELATED APPLICATION(S)

This application is the continuation application of U.S. patent application Ser. No. 16/823,840 filed on Mar. 19, 2020, which is a continuation of U.S. patent application Ser. No. 16/156,694 filed on Oct. 10, 2018, now U.S. Pat. No. 10,636,569 issued on Apr. 28, 2020, which claims the benefit of priority to Korean Patent Application No. 10-2018-0087283 filed on Jul. 26, 2018 in the Korean Intellectual Property Office, the disclosures of which are incorporated herein by reference in their entirety.

TECHNICAL FIELD

The present disclosure relates to a multilayer ceramic capacitor having improved product reliability.

BACKGROUND

In general, electronic parts using a ceramic material such as a capacitor, an inductor, a piezoelectric element, a varistor or a thermistor include a ceramic body formed of a ceramic material, an internal electrode disposed inside the body, and an external electrode provided on the surface of the ceramic body to be connected to the internal electrode.

Recently, owing to the miniaturization and multifunctionalization of electronic products, since there is also the tendency for miniaturization and high functionality in chip parts, a multilayer ceramic capacitor is also required to have a small sized and high capacity.

In particular, since a capacitance value in actual use conditions may be important, the DC-bias characteristics indicated as a capacitance value secured when the DC-bias is applied become an important consideration.

Also, since in the mobile phone market, the system is shifting from existing 4G to 5G networks, securing capacity under high frequency and low electric field conditions is becoming a major issue.

Proper grain growth control of dielectric grains in the ceramic body of the multilayer ceramic capacitor is essential for securing DC-bias characteristics and securing necessary capacitance under the high frequency and low electric field conditions as described above.

SUMMARY

An aspect of the present disclosure may provide a multilayer ceramic capacitor having improved product reliability.

According to an aspect of the present disclosure, a multilayer ceramic capacitor may include a ceramic body including a dielectric layer, a first internal electrode and a second internal electrode arranged to face each other with the dielectric layer interposed therebetween, a first surface and a second surface opposing each other, a third surface and a fourth surface connecting the first surface and the second surface respectively and opposing each other, and a fifth surface and a sixth surface connecting the first surface through the fourth surface and opposing each other; and a first external electrode disposed on an exterior surface of the ceramic body and electrically connected to the first internal electrode and a second external electrode disposed on the exterior surface of the ceramic body and electrically connected to the second internal electrode, wherein the ceramic body includes an active portion, forming capacity, including the first internal electrode and the second internal electrode disposed to face each other with the dielectric layer interposed therebetween, and further includes cover portions disposed on upper and lower portions of the active portion and margin portions disposed on side surfaces of the active portion, and wherein the dielectric layer, the cover portions, and the margin portions of the active portion each include magnesium (Mg) having a content of more than 0 mole, and less than or equal to 1.0 mole, relative to a content of titanium (Ti) included in the dielectric layer, the cover portions and the margin portions of the active portion, respectively.

According to another aspect of the present disclosure, a multilayer ceramic capacitor may include a ceramic body including a dielectric layer, a first internal electrode and a second internal electrode arranged to face each other with the dielectric layer interposed therebetween; and a first external electrode disposed on an exterior surface of the ceramic body and electrically connected to the first internal electrode and a second external electrode disposed on the exterior surface of the ceramic body and electrically connected to the second internal electrode, wherein the ceramic body includes an active portion, forming capacity, including the first internal electrode and the second internal electrode disposed to face each other with the dielectric layer interposed therebetween, and further includes margin portions disposed on side surfaces of the active portion and upper and lower surfaces of the active portion, the margin portions being outer portions of the ceramic body which exclude the active portion, and wherein the dielectric layer and the margin portions of the active portion each include magnesium (Mg) having a content of more than 0 mole, and less than or equal to 1.0 mole, with respect to a content of titanium (Ti) included in the dielectric layer and the margin portions of the active portion, respectively.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments in the present disclosure will now be described in detail with reference to the accompanying drawings.

Figure 1:
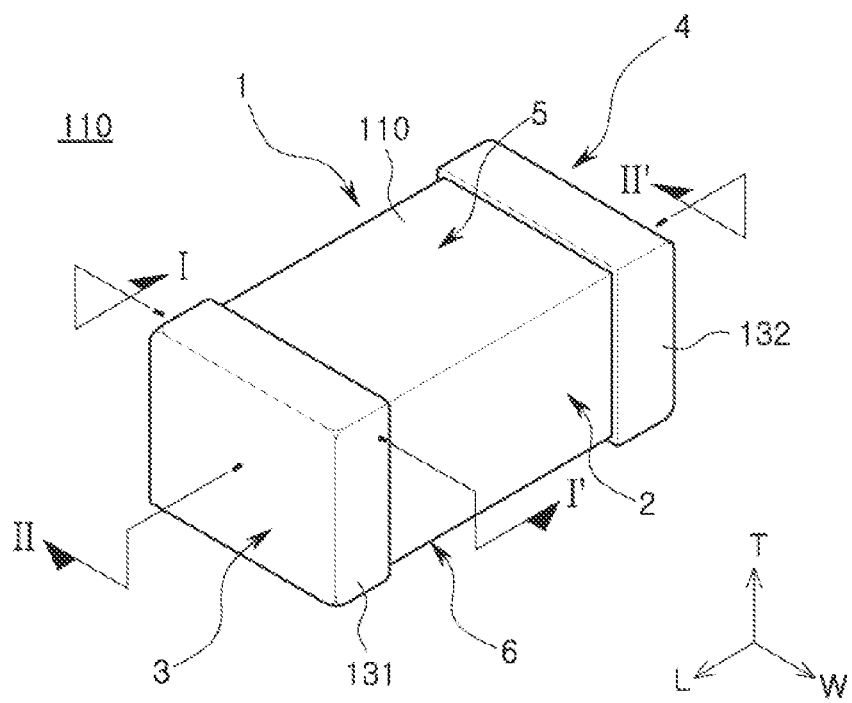
FIG. 1 is a schematic perspective view showing a multilayer ceramic capacitor according to an exemplary embodiment in the present disclosure.

FIG. 1 is a schematic perspective view showing a multilayer ceramic capacitor 100 according to an exemplary embodiment in the present disclosure.

Figure 2:
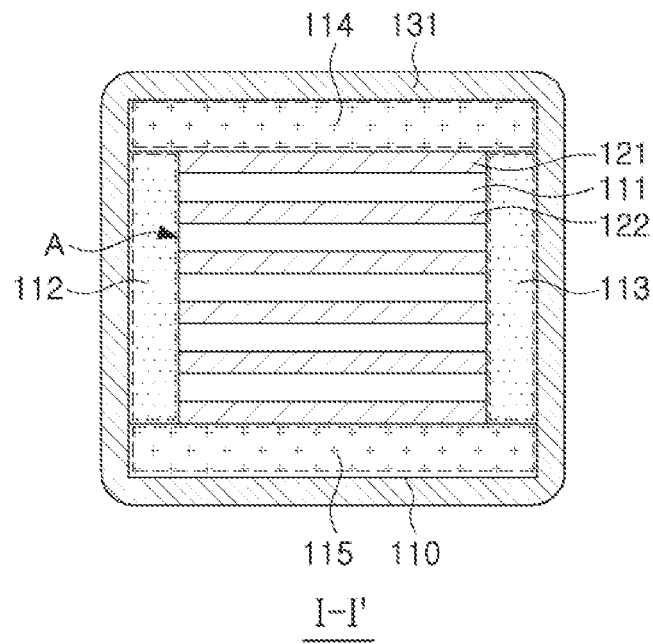
FIG. 2 is a cross-sectional view taken along line I-I' of FIG. 1.

FIG. 2 is a cross-sectional view taken along line I-I' of FIG. 1.

Figure 3:
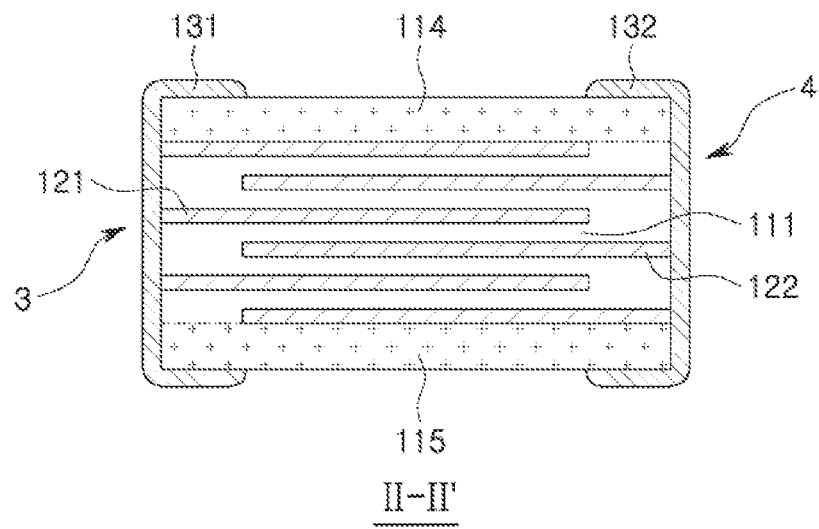
FIG. 3 is a cross-sectional view taken along line II-II' of FIG. 1.

FIG. 3 is a cross-sectional view taken along line II-II' of FIG. 1.

Referring to FIGS. 1 through 3, the multilayer ceramic capacitor 100 according to an exemplary embodiment in the present disclosure includes a ceramic body 110, a plurality of first and second internal electrodes 121 and 122 disposed inside the ceramic body 110, and first and second external electrodes 131 and 132 disposed on the external surface of the ceramic body 110.

The ceramic body 110 may have a first surface 1 and a second surface 2 opposing each other and a third surface 3 and a fourth surface 4 connecting the first surface 1 and the second surface 2 respectively, and a fifth surface 5 and a sixth surface 6 which are an upper surface and a lower surface respectively.

The first surface 1 and the second surface 2 may face each other in a width direction of the ceramic body 110. The third surface 3 and the fourth surface 4 may be defined as surfaces opposing each other in a longitudinal direction. The fifth surface 5 and the sixth surface 6 may be defined as surfaces opposing each other in a thickness direction.

The shape of the ceramic body 110 is not particularly limited, but may be a rectangular parallelepiped shape as shown.

The plurality of internal electrodes 121 and 122 disposed inside the ceramic body 110 have one ends exposed to the third surface 3 or the fourth surface 4 of the ceramic body 110.

The internal electrodes 121 and 122 may have a pair of the first internal electrode 121 and the second internal electrode 122 having different polarities.

One end of the first internal electrode 121 may be exposed to the third surface 3. One end of the second internal electrode 122 may be exposed to the fourth surface 4.

The other ends of the first internal electrode 121 and the second internal electrode 122 are formed at regular intervals from the third surface 3 or the fourth surface 4.

The first and second external electrodes 131 and 132 may be disposed on the third and fourth surfaces 3 and 4 of the ceramic body 110 and electrically connected to the first and second internal electrodes 121 and 122.

According to an exemplary embodiment in the present disclosure, a raw material forming a dielectric layer 111 is not particularly limited as long as sufficient electrostatic capacitance is obtainable therewith. For example, the raw material may be barium titanate ($BaTiO_3$) powder.

As the material forming the dielectric layer 111, various ceramic additives, organic solvents, plasticizers, binders, dispersants and the like may be added to powder such as barium titanate ($BaTiO_3$) according to the purpose of the present disclosure.

The dielectric layer 111 may be in a sintered state such that boundaries between adjacent dielectric layers may be integrated may not confirmed with the naked eye.

The length of the ceramic body 110 corresponds to a distance from the third surface 3 to the fourth surface 4 of the ceramic body 110.

The length of the dielectric layer 111 forms the distance between the third surface 3 and the fourth surface 4 of the ceramic body 110.

According to an exemplary embodiment in the present disclosure, the length of the ceramic body 110 may be 400 to 1400 μm but is not limited thereto. More specifically, the length of the ceramic body 110 may be 400 to 800 μm, or 600 to 1400 μm.

The internal electrodes 121 and 122 may be disposed on the dielectric layer 111 and may be formed inside the ceramic body 110 with a single dielectric layer interposed therebetween by sintering.

Referring to FIG. 3, the first internal electrode 121 is disposed on the dielectric layer 111. The first internal electrode 121 is not formed entirely with respect to the longitudinal direction of the dielectric layer 111. That is, one end of the first internal electrode 121 may be formed at a predetermined distance from the fourth surface 4 of the ceramic body 110, and the other end of the first internal electrode 121 may be formed up to the third surface 3 and exposed to the third surface 3.

The end of the first internal electrode 121 exposed to the third surface 3 of the ceramic body 110 is connected to the first external electrode 131.

To the contrary of the first internal electrode 121, one end of the second internal electrode 122 is formed at a predetermined distance from the third surface 3 and the other end of the second internal electrode 122 is exposed to the fourth surface 4 and is connected to the second external electrode 132.

The material of forming the first and second internal electrodes 121 and 122 is not particularly limited. For example, the first and second internal electrodes 121 and 122 may be formed by using a conductive paste including one or more materials selected from the group consisting of silver (Ag), lead (Pb), platinum (Pt), nickel (Ni), and copper (Cu).

The first and second external electrodes 131 and 132 may be electrically connected to the first and second internal electrodes 121 and 122 respectively to form capacitance. The second external electrode 132 may be connected to the first external electrode 131 at a different electric potential.

The multilayer ceramic capacitor 100 according to an exemplary embodiment in the present disclosure includes an active portion A disposed inside the ceramic body 110 and forming capacity including the first internal electrode 121 and the second internal electrode 122 arranged to face each other with the dielectric layer 111 interposed therebetween, cover portions 114 and 115 disposed on upper and lower portions of the active portion A respectively, and margin portions 112 and 113 provided on the side surfaces of the active portion A.

The active portion A is as a portion contributing to capacity formation of the capacitor 100 and may be formed by repeatedly stacking the plurality of first and second internal electrodes 121 and 122 with a dielectric layer 111 interposed therebetween.

The upper cover portion 114 and the lower cover portion 115 may have the same material and configuration as the dielectric layer 111 except that the upper cover portion 114 and the lower cover portion 115 do not include internal electrodes.

That is, the upper cover portion 114 and the lower cover portion 115 may include a ceramic material, for example, a barium titanate ($BaTiO_3$) based ceramic material.

The upper cover portion 114 and the lower cover portion 115 may be formed by stacking a single dielectric layer or two or more dielectric layers on the upper and lower surfaces of the active portion A in the vertical direction and may basically prevent damage of an internal electrode by physical or chemical stress.

The margin portions 112 and 113 include the margin portion 112 disposed on the first surface 1 of the ceramic body 110 and the margin portion 113 disposed on the second surface 2.

That is, the margin portions 112 and 113 may be disposed on both sides of the ceramic body 110 in the width direction.

As shown in FIG. 2, the margin portions 112 and 113 mean regions between both ends of the first and second internal electrodes 121 and 122 and an interface of the ceramic body 110 in a cross section of the ceramic body 110 cut in the width-thickness (WT) direction.

According to an exemplary embodiment in the present disclosure, the dielectric layer 111, the cover portions 114 and 115 and the margin portions 112 and 113 of the active portion A include magnesium (Mg). The magnesium (Mg) has content of more than 0 mole, and less than or equal to 1.0 mole, relative to titanium (Ti) included in each of the dielectric layer 111, the cover portions 114 and 115 and the margin portions 112 and 113 of the active portion A.

Recently, owing to the miniaturization and multi-functionalization of electronic products, since there is also the tendency of miniaturization and high functionality of chip parts, a multilayer ceramic capacitor is also required to have a small size and high capacity.

In particular, since a capacitance value in the actual use condition becomes important, the DC-bias characteristic indicated as a capacitance value secured when the DC-bias is applied becomes an important condition.

Also, since the system shifts from the existing 4G to 5G in a mobile phone market, securing capacity under high frequency and low electric field conditions is becoming a major issue.

Proper grain growth control of dielectric grains in the ceramic body of the multilayer ceramic capacitor is essential for securing the DC-bias characteristic and securing the necessary capacitance under the high frequency and low electric field conditions as described above.

According to an exemplary embodiment in the present disclosure, the dielectric layer 111, the cover portions 114 and 115, and the margin portions 112 and 113 of the active portion A in the ceramic body 110 may include magnesium (Mg) and in which the content of magnesium (Mg) is controlled, and thus the grain growth control of dielectric grains in each region may be controlled, thereby securing the DC-bias characteristic and securing the necessary capacitance under the high frequency and low electric field conditions.

That is, according to an exemplary embodiment in the present disclosure, for the effective grain growth control of dielectric grains of the dielectric layer 111, the cover portions 114 and 115, and the margin portions 112 and 113 of the active portion A in the ceramic body 110, all of the dielectric layer 111, the cover portions 114 and 115 and the margin portions 112 and 113 of the active portion A include magnesium (Mg).

In addition, in an exemplary embodiment in the present disclosure, the content of magnesium (Mg) included in the dielectric layer 111, the cover portions 114 and 115, and the margin portions 112 and 113 of the active portion A may be controlled, thereby securing the DC-bias characteristic and securing the necessary capacitance under the high frequency and low electric field conditions.

The dielectric layer 111, the cover portions 114 and 115 and the margin portions 112 and 113 of the active portion A may include a mother material main component including Ba and Ti.

The mother material main component includes a main component expressed as $(Ba,Ca)(Ti,Ca)O_3$, $(Ba,Ca)(Ti,Zr)O_3$, $Ba(Ti,Zr)O_3$, and $(Ba,Ca)(Ti,Sn)O_3$ which partially employ $BaTiO_3$ or Ca, Zr, Sn. The mother material main component may be included in the form of powder.

The dielectric layer 111, the cover portions 114 and 115 and the margin portions 112 and 113 of the active portion A may include a first subcomponent including at least one of Mn, V, Cr, Fe, Ni, Co, Cu, and Zn as a subcomponent.

Also, the dielectric layer 111, the cover portions 114 and 115 and the margin portions 112 and 113 of the active portion A may further include a second subcomponent including at least one of Ba and Ca, a third subcomponent including an oxide or carbonate containing Si, or a glass compound including Si, a fourth subcomponent including at least one of Y, Dy, Ho, Er, Gd, Ce, Nd, Sm, La, Tb, Yb and Pr, and a fifth subcomponent including Mg or Al.

The magnesium (Mg) included in the dielectric layer 111, the cover portions 114 and 115 and the margin portions 112 and 113 of the active portion A has content of more than 0 mole, and less than or equal to 1.0 mole, relative to titanium (Ti) included in each of the dielectric layer 111, the cover portions 114 and 115 and the margin portions 112 and 113 of the active portion A.

In general, magnesium (Mg) oxide is known to be added to barium titanate to control the grain growth of dielectric grains.

That is, it is known that when the content of magnesium (Mg) oxide added to barium titanate is large, the grain growth of dielectric grains is suppressed, and when the amount of addition is small, abnormal grain growth particles are generated.

However, the content of magnesium (Mg) that may effectively control grain growth of the dielectric grain is not particularly known.

According to an exemplary embodiment in the present disclosure, each region may include the content of magnesium (Mg) of more than 0 mole and less than or equal to 1.0 mole relative to titanium (Ti) as described above, thereby securing the DC-bias characteristic and securing the necessary capacitance under the high frequency and low electric field conditions.

When the content of magnesium (Mg) is 0 mole relative to titanium (Ti) in each region, the dielectric grains in each region are excessively grown, and DC-bias characteristics may not be ensured, and it is difficult to secure the necessary capacitance under the high frequency and low electric field conditions.

Meanwhile, when the content of magnesium (Mg) exceeds 1.0 mole relative to titanium (Ti) in each region, since the grain growth of the dielectric grains in each region may be excessively suppressed, it is difficult to secure the necessary capacitance.

In particular, the multilayer ceramic capacitor 100 according to an exemplary embodiment in the present disclosure is an ultra small and high capacity product. The thickness of the dielectric layer 111 is 0.4 µm or less and the thickness of the first and second internal electrodes 121 and 122 is 0.4 µm or less, but the present disclosure is not necessarily limited thereto.

Since the multilayer ceramic capacitor 100 according to an exemplary embodiment in the present disclosure is the an ultra small and high capacity product, the thickness of the dielectric layer 111 and the first and second inner electrodes 121 and 122 are relatively thin compared to the conventional product. In the case of a product to which such a thin film dielectric layer and a thin internal electrode are applied, the grain growth control of dielectric grains in each region of a dielectric layer, a cover portion, and a margin portion of an active portion is a very important issue for achieving the target capacitance and improving product reliability.

That is, since the dielectric layer and the internal electrode included in the conventional multilayer ceramic capacitor have a relatively greater thickness than the dielectric layer and the internal electrode included in the multilayer ceramic capacitor according to an exemplary embodiment in the present disclosure, adjusting the content of magnesium (Mg) for the grain growth control of dielectric grains in each region of a dielectric layer, a cover portion, and a margin portion of an active portion was not a major problem.

However, in a product to which the thin dielectric layer and internal electrode are applied as in an exemplary embodiment in the present disclosure, the content of magnesium (Mg) included in each region of a dielectric layer, a cover portion, and a margin portion of an active portion needs to be adjusted for the grain growth control of dielectric grains.

According to an exemplary embodiment in the present disclosure, since each region includes the content of magnesium (Mg) of more than 0 mole and less than or equal to 1.0 mole relative to titanium (Ti), even when the dielectric layer 111 and the first and second internal electrodes 121 and 122 are thin films having the thickness of 0.4 μm or less, the DC-bias characteristic may be secured, and the necessary capacitance under the high frequency and low electric field conditions may be secured.

However, the thin film does not mean that the thicknesses of the dielectric layer 111 and the first and second internal electrodes 121 and 122 are limited to 0.4 μm or less, but may be understood as having thicknesses thinner than those of the conventional product.

Figure 4:
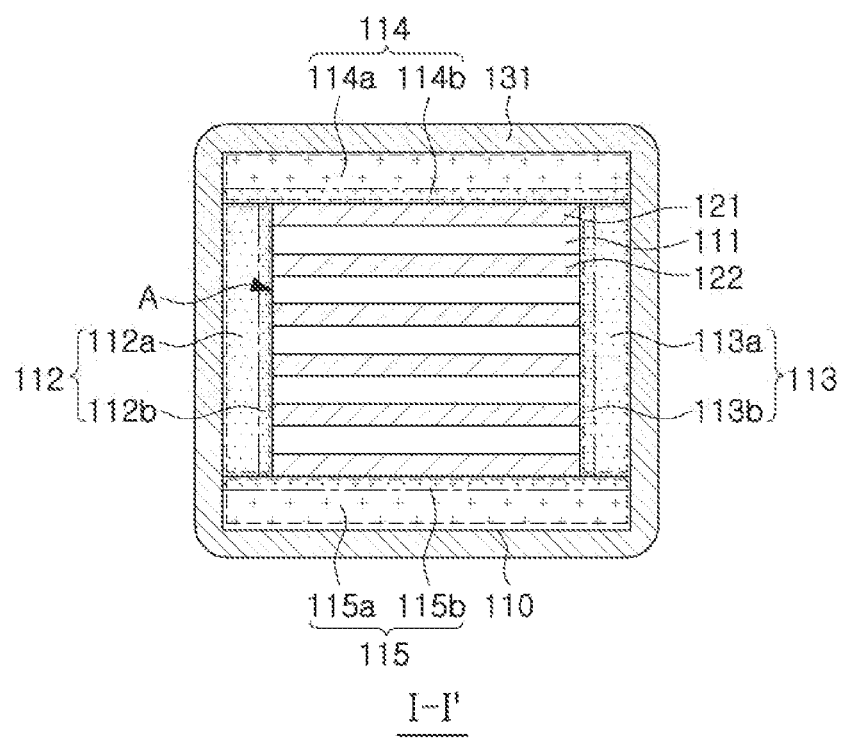
FIG. 4 is a cross-sectional view taken along line I-I' of FIG. 1 according to another exemplary embodiment in the present disclosure.

FIG. 4 is a cross-sectional view taken along line I-I' of FIG. 1 according to another exemplary embodiment in the present disclosure.

Figure 5:
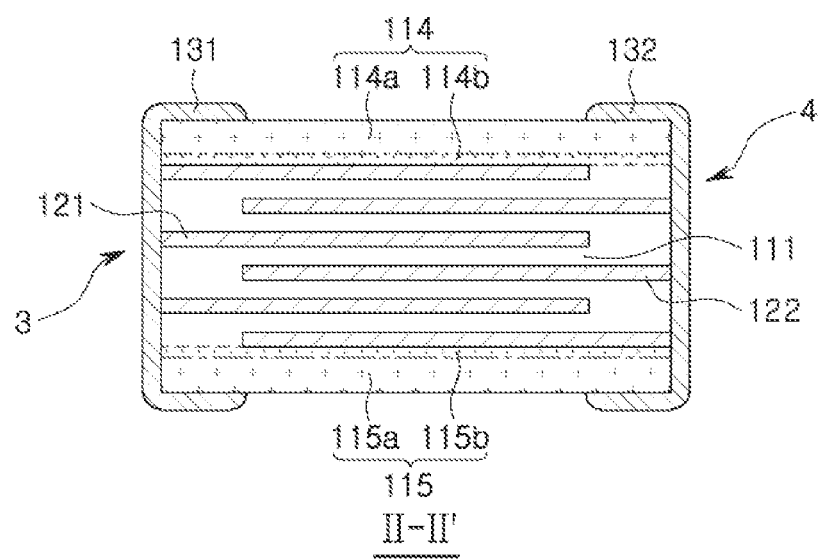
FIG. 5 is a cross-sectional view taken along line II-II' of FIG. 1 according to another exemplary embodiment in the present disclosure.

FIG. 5 is a cross-sectional view taken along line II-II' of FIG. 1 according to another exemplary embodiment in the present disclosure.

Referring to FIGS. 4 and 5, in a multilayer ceramic capacitor according to another exemplary embodiment in the present disclosure, the cover portions 114 and 115 are divided into first regions 114a and 115a adjacent to an outer surface of the ceramic body 110 and second regions 114b and 115b adjacent to the outermost one of the first and second internal electrodes 121 and 122. Content of magnesium (Mg) included in the first regions 114a and 115a and the second regions 114b and 115b may be different.

According to another exemplary embodiment in the present disclosure, the cover portions 114 and 115 in the ceramic body 110 are divided into two regions having different compositions, and the content of magnesium (Mg) included in each region is different, and thus the denseness of the cover portions 114 and 115 may be enhanced, thereby improving the moisture resistance characteristic.

The content of magnesium (Mg) included in the first regions 114a and 115a of the cover portions 114 and 115 may be greater than the content of magnesium (Mg) included in the second regions 114b and 115b.

The first regions 114a and 115a of the cover portions 114 and 115 are regions adjacent to the outer surface of the ceramic body 110, and the content of magnesium (Mg) included in the first regions 114a and 115a may be adjusted to be greater than the content of magnesium (Mg) included in the second regions 114b and 115b of inside, and thus the denseness of the first regions 114a and 115a of the cover portions 114 and 115 may be enhanced, thereby improving the moisture resistance characteristic.

Meanwhile, the content of magnesium (Mg) included in the second regions 114b and 115b of the cover portions 114 and 115 may be greater than the content of magnesium (Mg) included in the first regions 114a and 115a.

The content of magnesium (Mg) included in the second regions 114b and 115b of the cover portions 114 and 115 may be adjusted to be greater than the content of magnesium (Mg) included in the first regions 114a and 115a of outside, and thus the denseness of the second regions 114b and 115b of the cover portions 114 and 115 may be enhanced, thereby improving the moisture resistance characteristic.

In particular, the content of magnesium (Mg) included in the first regions 114a and 115a of the cover portions 114 and 115 adjacent to the outer surface of the ceramic body 110 may be reduced, and thus adhesion with the first external electrode 131 and the second external electrode 132 may be improved.

According to another exemplary embodiment in the present disclosure, the margin portions 112 and 113 are divided into first regions 112a and 113a adjacent to an outer surface of the ceramic body 110 and second regions 112b and 113b adjacent to the first and second internal electrodes 121 and 122, and the content of magnesium (Mg) included in the first regions 112a and 113a and the second regions 112b and 113b may be different.

The margin portions 112 and 113 inside the ceramic body 110 may be divided into two regions having different compositions and the content of magnesium (Mg) included in each region may be different, and thus the denseness of the margin portions 112 and 113 may be enhanced, thereby improving the moisture resistance characteristic.

The content of magnesium (Mg) included the first regions 112a and 113a of the margin portions 112 and 113 may be greater than the content of magnesium (Mg) included in the second regions 112b and 113b.

The first regions 112a and 113a of the margin portions 112 and 113 are regions adjacent to the outer surface of the ceramic body 110 and the content of magnesium (Mg) included in the first regions 112a and 113a may be adjusted to be greater than the content of magnesium (Mg) included in the second regions 112b and 113b of inside, and thus the denseness of the first regions 112a and 113a of the margin portions 112 and 113 may be enhanced, thereby improving the moisture resistance characteristic.

Meanwhile, the content of magnesium (Mg) included in the second regions 112b and 113b of the margin portions 112 and 113 may be greater than the content of magnesium (Mg) included in the first regions 112a and 113a.

The content of magnesium (Mg) included in the second regions 112b and 113b of the margin portions 112 and 113 may be adjusted to be greater than the content of magnesium (Mg) included in the outside first regions 112a and 113a of the margin portions 112 and 113, and thus the denseness of the second regions 112b and 113b of the margin portions 112 and 113 may be enhanced, thereby improving the moisture resistance characteristic.

In particular, the content of magnesium (Mg) included in the first regions 112a and 113a of the margin portions 112 and 113 adjacent to the outer surface of the ceramic body 110 may be reduced, and thus adhesion with the first external electrode 131 and the second external electrode 132 may be improved.

Hereinafter, a method of manufacturing multilayer ceramic electronic parts according to an exemplary embodiment in the present disclosure will be described, but the present disclosure is not limited thereto.

The method of manufacturing the multilayer ceramic electronic parts according to the exemplary embodiment in the present disclosure may firstly apply and dry a slurry formed of powder such as barium titanate ($BaTiO_3$) or the like onto a carrier film to prepare a plurality of ceramic green sheets, thereby forming a dielectric layer.

The ceramic green sheets may be manufactured by mixing ceramic powder, a binder, and a solvent to prepare the slurry as sheets having a thickness of several micrometers by using a doctor blade method.

The ceramic powder includes a mother material main component expressed as (Ba,Ca) (Ti,Ca)$O_3$, (Ba,Ca) (Ti,Zr)$O_3$, Ba(Ti,Zr)$O_3$, and (Ba,Ca) (Ti,Sn)$O_3$ which partially employ $BaTiO_3$ or Ca, Zr, Sn. The mother material main component may be included in the form of powder.

The ceramic powder may include magnesium (Mg) as a subcomponent. Content of magnesium (Mg) is more than 0 mole and less than or equal to 1.0 mole relative to titanium (Ti).

Next, an internal electrode conductive paste including nickel powder having an average nickel particle size of 0.1 to 0.2 μm and 40 to 50 parts by weight may be provided.

The internal electrode conductive paste is applied on the green sheets by using a screen printing method to form internal electrodes, and the green sheets having internal electrode patterns arranged thereon are stacked to form the ceramic body 110.

Next, external electrodes including a conductive metal and glass may be disposed on the outside of the ceramic body 110.

The conductive metal is not particularly limited, but may be at least one selected from the group consisting of, for example, copper (Cu), silver (Ag), nickel (Ni), and alloys thereof.

The glass is not particularly limited, and a material having the same composition as glass used for manufacturing an external electrode of a general multilayer ceramic capacitor may be used.

The external electrodes may be disposed on an external surface of the ceramic body 110 and electrically connected to the first and second internal electrodes, respectively.

A plating layer may further be formed on the external electrodes.

The plating layer is not particularly limited, but may include at least one selected from the group consisting of, for example, nickel (Ni), tin (Sn), and alloys thereof.

As set forth above, according to the exemplary embodiment in the present disclosure, a dielectric layer, cover portions, and margin portions of an active portion in a ceramic body may include magnesium (Mg), and content of magnesium (Mg) may be adjusted, and thus grain growth control of dielectric grains may be controlled, thereby securing DC-bias characteristics, and securing the necessary capacitance under high frequency and low electric field conditions.

While exemplary embodiments have been shown and described above, it will be apparent to those skilled in the art that modifications and variations could be made without departing from the scope in the present disclosure as defined by the appended claims.

What is claimed is:

1. A multilayer ceramic capacitor comprising:
   a ceramic body including an active portion and margin portions disposed on side surfaces of the active portion, the active portion including a dielectric layer, a first internal electrode and a second internal electrode arranged to face each other with the dielectric layer interposed therebetween in a stacking direction; and
   a first external electrode disposed on an exterior surface of the ceramic body and electrically connected to the first internal electrode and a second external electrode disposed on the exterior surface of the ceramic body and electrically connected to the second internal electrode,
   wherein a thickness of the dielectric layer is 0.4 μm or less,
   wherein the margin portions include magnesium (Mg) having a content of more than 0 mole and less than or equal to 1.0 mole, relative to 100 moles of titanium (Ti) included in the margin portions,
   wherein each of the margin portions includes a first region adjacent to an outer surface of the ceramic body and a second region adjacent to the first and second internal electrodes, and a content of magnesium (Mg) included in the first region of the margin portions is greater than a content of magnesium (Mg) included in the second region,
   the ceramic body further includes cover portions disposed on upper and lower surfaces of the active portion in the stacking direction, and
   compositions of the cover portions and the dielectric layer are substantially the same.

2. The multilayer ceramic capacitor of claim 1, wherein the dielectric layer in the active portion and the margin portions includes a main component including Ba and Ti.

3. The multilayer ceramic capacitor of claim 2, wherein the dielectric layer in the active portion and the margin portions includes a third subcomponent including Si.

4. The multilayer ceramic capacitor of claim 3, wherein a thickness of each of the first internal electrode and the second internal electrode is 0.4 μm or less.

5. The multilayer ceramic capacitor of claim 1, wherein the dielectric layer in the active portion and the margin portions include a first subcomponent including at least one of Mn, V, Cr, Fe, Ni, Co, Cu, or Zn.

6. The multilayer ceramic capacitor of claim 1, wherein the dielectric layer in the active portion and the margin portions include a second subcomponent including at least one of Ba or Ca.

7. The multilayer ceramic capacitor of claim 1, wherein the dielectric layer in the active portion and the margin portions includes a third subcomponent including Si.

8. The multilayer ceramic capacitor of claim 1, wherein the dielectric layer in the active portion and the margin portions includes a fourth subcomponent including at least one of Y, Dy, Ho, Er, Gd, Ce, Nd, Sm, La, Tb, Yb or Pr.

9. The multilayer ceramic capacitor of claim 1, wherein the dielectric layer in dielectric layer in the active portion and the margin portions includes a fifth subcomponent including Mg or Al.

10. The multilayer ceramic capacitor of claim 9, wherein a thickness of each of the first internal electrode and the second internal electrode is 0.4 μm or less.

11. The multilayer ceramic capacitor of claim 1, wherein the content of magnesium (Mg) in the dielectric layer of the active portion and the cover portions is same.

12. The multilayer ceramic capacitor of claim 1, wherein a thickness of each of the first internal electrode and the second internal electrode is 0.4 μm or less.

13. The multilayer ceramic capacitor of claim 1,
    wherein in a direction in which the first region and the second region of the margin portions are separated from each other, a width of the first region is greater than a width of the second region.

14. The multilayer ceramic capacitor of claim 1,
    wherein a degree of densification of the first region of the margin portions is larger than a degree of densification of the second region of the margin portions.

15. The multilayer ceramic capacitor of claim 1,
wherein the cover portions extend over an entire width of the body, and
wherein each of the cover portions is divided into a first region adjacent to an outer surface of the ceramic body and a second region adjacent to an outermost one of the first and second internal electrodes, and a content of magnesium (Mg) included in the first region of the cover portions is different from a content of magnesium (Mg) included in the second region of the cover portions.

16. The multilayer ceramic capacitor of claim 1,
wherein each of the cover portions is divided into a first region adjacent to an outer surface of the ceramic body and a second region adjacent to an outermost one of the first and second internal electrodes, and a content of magnesium (Mg) included in the first region of the cover portions is different from a content of magnesium (Mg) included in the second region of the cover portions.

17. The multilayer ceramic capacitor of claim 16,
wherein a content of magnesium (Mg) included in the first region of the cover portions is greater than a content of magnesium (Mg) included in the second region of the cover portions.

18. The multilayer ceramic capacitor of claim 16,
wherein a content of magnesium (Mg) included in the first region of the cover portions is smaller than a content of magnesium (Mg) included in the second region of the cover portions.

19. A multilayer ceramic capacitor comprising:
a ceramic body including an active portion and margin portions disposed on side surfaces of the active portion, the active portion including a dielectric layer, a first internal electrode and a second internal electrode arranged to face each other with the dielectric layer interposed therebetween in a stacking direction; and
a first external electrode disposed on an exterior surface of the ceramic body and electrically connected to the first internal electrode and a second external electrode disposed on the exterior surface of the ceramic body and electrically connected to the second internal electrode,
wherein the ceramic body further includes cover portions disposed on upper and lower surfaces of the active portion in the stacking direction,
wherein each of the cover portions is divided into a first region adjacent to an outer surface of the ceramic body and a second region adjacent to an outermost one of the first and second internal electrodes, and a content of magnesium (Mg) included in the first region of the cover portions is greater than a content of magnesium (Mg) included in the second region, and
wherein the margin portions include magnesium (Mg) having a content of more than 0 mole and less than or equal to 1.0 mole, relative to 100 moles of titanium (Ti) included in the margin portions,
compositions of the cover portions and the dielectric layer are substantially the same and
a content of magnesium (Mg) included in a first region of the margin portions is greater than a content of magnesium (Mg) included in a second region of the margin portions.

20. The multilayer ceramic capacitor of claim 19, wherein the dielectric layer in the active portion and the margin portions includes a main component including Ba and Ti.

21. The multilayer ceramic capacitor of claim 19, wherein the dielectric layer in the active portion and the margin portions includes a third subcomponent including Si.

22. The multilayer ceramic capacitor of claim 21, wherein a thickness of the dielectric layer is 0.4 μm or less.

23. The multilayer ceramic capacitor of claim 22, wherein a thickness of each of the first internal electrode and the second internal electrode is 0.4 μm or less.

24. The multilayer ceramic capacitor of claim 19, wherein a thickness of the dielectric layer is 0.4 μm or less.

25. The multilayer ceramic capacitor of claim 19, wherein a thickness of each of the first internal electrode and the second internal electrode is 0.4 μm or less.

26. A multilayer ceramic capacitor comprising:
a ceramic body including an active portion and margin portions disposed on side surfaces of the active portion, the active portion including a dielectric layer, a first internal electrode and a second internal electrode arranged to face each other with the dielectric layer interposed therebetween in a stacking direction; and
a first external electrode disposed on an exterior surface of the ceramic body and electrically connected to the first internal electrode and a second external electrode disposed on the exterior surface of the ceramic body and electrically connected to the second internal electrode,
wherein a thickness of the dielectric layer is 0.4 μm or less,
wherein the margin portions include magnesium (Mg) having a content of more than 0 mole and less than or equal to 1.0 mole, relative to 100 moles of titanium (Ti) included in the margin portions,
wherein the ceramic body further includes cover portions disposed on upper and lower surfaces of the active portion in the stacking direction
wherein each of the cover portions is divided into a first region adjacent to an outer surface of the ceramic body and a second region adjacent to an outermost one of the first and second internal electrodes, and a content of magnesium (Mg) included in the first region of the cover portions is different from a content of magnesium (Mg) included in the second region of the cover portions,
compositions of the cover portions and the dielectric layer are substantially the same and
a content of magnesium (Mg) included in a first region of the margin portions is greater than a content of magnesium (Mg) included in a second region of the margin portions.

27. The multilayer ceramic capacitor of claim 26,
the first region is adjacent to an outer surface of the ceramic body and the second region is adjacent to the first and second internal electrodes, and the content of magnesium (Mg) included in the first region of the margin portions is different from the content of magnesium (Mg) included in the second region of the margin portions.

28. The multilayer ceramic capacitor of claim 27, wherein the content of magnesium (Mg) included in the second region of the cover portions is greater than the content of magnesium (Mg) included in the first region of the cover portions.

29. The multilayer ceramic capacitor of claim 26, wherein a thickness of each of the first internal electrode and the second internal electrode is 0.4 μm or less.

30. The multilayer ceramic capacitor of claim 26, wherein the content of magnesium (Mg) included in the second region of the cover portions is greater than the content of magnesium (Mg) included in the first region of the cover portions.

31. The multilayer ceramic capacitor of claim 26, wherein the ceramic body further includes cover portions disposed on upper and lower surfaces of the active portion in the stacking direction and extending to cover an entire width of the body.

32. A multilayer ceramic capacitor comprising:
a ceramic body including an active portion and margin portions disposed on side surfaces of the active portion, the active portion including a dielectric layer, a first internal electrode and a second internal electrode arranged to face each other with the dielectric layer interposed therebetween in a stacking direction; and
a first external electrode disposed on an exterior surface of the ceramic body and electrically connected to the first internal electrode and a second external electrode disposed on the exterior surface of the ceramic body and electrically connected to the second internal electrode,
wherein a thickness of the dielectric layer is 0.4 µm or less,
wherein the dielectric layer includes a main component including Ba and Ti,
wherein the dielectric layer includes a third subcomponent including Si, and
wherein the margin portions include magnesium (Mg), each of the margin portions includes a first region adjacent to an outer surface of the ceramic body and a second region adjacent to the first and second internal electrodes, and a content of magnesium (Mg) included in the first region of the margin portions is different from a content of magnesium (Mg) included in the second region of the margin portions,
the ceramic body further includes cover portions disposed on upper and lower surfaces of the active portion in the stacking direction,
compositions of the cover portions and the dielectric layer are substantially the same and
the content of magnesium (Mg) included in the first region of the margin portions is greater than the content of magnesium (Mg) included in the second region of the margin portions.

33. The multilayer ceramic capacitor of claim 32, wherein a thickness of each of the first internal electrode and the second internal electrode is 0.4 µm or less.

34. The multilayer ceramic capacitor of claim 32, wherein the content of magnesium (Mg) in the dielectric layer of the active portion and the cover portions is same.

35. The multilayer ceramic capacitor of claim 32, wherein each of the cover portions is divided into a first region adjacent to an outer surface of the ceramic body and a second region adjacent to an outermost one of the first and second internal electrodes, and a content of magnesium (Mg) included in the first region of the cover portions is different from a content of magnesium (Mg) included in the second region of the cover portions.

36. The multilayer ceramic capacitor of claim 32, wherein each of the cover portions is divided into a first region adjacent to an outer surface of the ceramic body and a second region adjacent to an outermost one of the first and second internal electrodes, and a content of magnesium (Mg) included in the first region of the cover portions is greater than a content of magnesium (Mg) included in the second region of the cover portions.

* * * * *